(12) United States Patent
Freeman et al.

(10) Patent No.: US 11,215,080 B1
(45) Date of Patent: Jan. 4, 2022

(54) TURBINE SHROUD ASSEMBLY WITH INTEGRATED CERAMIC MATRIX COMPOSITE COMPONENT SUPPORT PINS

(71) Applicant: Rolls-Royce Corporation, Indianapolis, IN (US)

(72) Inventors: Ted J. Freeman, Danville, IN (US); Aaron D. Sippel, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 16/951,582

(22) Filed: Nov. 18, 2020

(51) Int. Cl.
*F01D 11/08* (2006.01)
*F01D 25/12* (2006.01)
*F01D 25/24* (2006.01)
*F01D 25/28* (2006.01)

(52) U.S. Cl.
CPC ............ *F01D 25/243* (2013.01); *F01D 11/08* (2013.01); *F01D 25/12* (2013.01); *F01D 25/28* (2013.01); *F05D 2240/11* (2013.01); *F05D 2240/55* (2013.01); *F05D 2260/201* (2013.01); *F05D 2260/232* (2013.01); *F05D 2260/30* (2013.01); *F05D 2300/6033* (2013.01)

(58) Field of Classification Search
CPC ........ F01D 11/08; F01D 25/12; F01D 25/243; F01D 25/28; F05D 2240/11; F05D 2240/55; F05D 2260/201; F05D 2260/232; F05D 2260/30; F05D 2300/6033
See application file for complete search history.

(56) References Cited

U.S. PATENT DOCUMENTS

| | | | | |
|---|---|---|---|---|
| 6,139,257 | A * | 10/2000 | Proctor | F01D 9/04 415/115 |
| 2016/0258304 | A1 * | 9/2016 | Sippel | F01D 25/246 |
| 2017/0002674 | A1 * | 1/2017 | Vetters | F01D 25/246 |
| 2017/0260869 | A1 * | 9/2017 | Vetters | F01D 11/08 |
| 2017/0342849 | A1 * | 11/2017 | Rice | F01D 11/005 |
| 2018/0149030 | A1 * | 5/2018 | Freeman | F01D 11/005 |
| 2018/0149041 | A1 * | 5/2018 | Freeman | F01D 25/246 |
| 2018/0298773 | A1 * | 10/2018 | Vetters | F01D 11/005 |

* cited by examiner

*Primary Examiner* — Igor Kershteyn
(74) *Attorney, Agent, or Firm* — Barnes & Thornburg LLP (57) ABSTRACT

A turbine shroud assembly for use with a gas turbine engine includes a turbine outer case, a blade track segment, and a carrier assembly. The carrier assembly includes a forward carrier segment and an aft carrier segment, and each of the forward carrier segment and aft carrier segment include integrated pins. The carrier assembly is configured to couple the blade track segment to the turbine outer case.

20 Claims, 9 Drawing Sheets

TURBINE SHROUD ASSEMBLY WITH INTEGRATED CERAMIC MATRIX COMPOSITE COMPONENT SUPPORT PINS

FIELD OF THE DISCLOSURE

The present disclosure relates generally to gas turbine engines, and more specifically to turbine shroud assemblies for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. In some examples, coupling such components with traditional fasteners such as rivets or bolts may not allow for the differing levels of expansion and contraction during operation of the gas turbine engine.

SUMMARY

The present disclosure may comprise one or more of the following features and combinations thereof.

A turbine shroud assembly may include a turbine outer case, a blade track segment, and a carrier. The turbine outer case may be arranged circumferentially around an axis. The blade track segment may include an arcuate runner and an attachment feature. The arcuate runner may extend circumferentially around the axis to define a gas path boundary of the turbine shroud assembly. The attachment feature may extend radially outward from the runner and include a first mount flange and a second flange. The second mount flange may be located axially aft of the first mount flange.

The carrier assembly may couple the blade track segment to the turbine outer case. The carrier assembly may include a first carrier segment and a second carrier segment. The first carrier segment may be shaped to have a first radial wall and a first integrated support pin. The first radial wall may be located forward of the first mount flange. The first integrated support pin may extend axially aft from the first radial wall and through a first pin hole in the first mount flange to couple therewith. The second carrier segment may be shaped to have a second radial wall and a second integrated pin. The second radial wall may be located aft of the second mount flange. The second integrated pin may extend axially forward from the second radial wall and through a second pin hole in the second mount flange to couple therewith.

In some embodiments, a cooling hole may be formed in the first integrated support pin to provide cooling air to the second integrated support pin and an outer surface of the arcuate runner of the blade trade segment. In another embodiment, the first integrated support pin may have a greater axial length than the second integrated support pin. The first integrated support pin may extend axially aft to form a small gap between the first integrated support pin and the second integrated support pin. The small gap may allow cooling air to be directly impinged onto the second integrated support pin.

In other embodiments, the turbine shroud assembly may further include a sleeve that extends between the first integrated support pin and the second integrated support pin. The sleeve may transfer cooling air from the first integrated support pin to the second integrated support pin. In some embodiments, impingement cooling holes may be formed in a radially inward side of the sleeve to direct cooling air to the outer surface of the arcuate runner.

In another embodiment, the first carrier segment may include a third integrated support pin that extends axially aft from the first radial wall and is circumferentially spaced apart from the first integrated support pin. The second carrier segment may include a fourth integrated support pin that extends axially forward from the second radial wall and is circumferentially spaced apart from the second integrated support pin. In other embodiments, a cooling hole may be formed in the third integrated support pin.

In some embodiments, an elongated sleeve may extend circumferentially between the first and third integrated support pins. The elongated sleeve may also extend axially between the first and second integrated support pins and third and fourth integrated support pins. The elongated sleeve may allow cooling air to be transferred from the first and third integrated support pins to the second and fourth integrated support pins. In another embodiment, impingement cooling holes may be formed in a radially inward side of the elongated sleeve to direct cooling air to the outer surface of the arcuate runner.

In other embodiments, the turbine shroud assembly may further include a bias member may be located between the first radial wall and the first mount flange. The bias member may push the blade track segment axially aft so that the second mount flange engages a cordial seal that axially locates the blade track segment.

In some embodiments, the turbine shroud assembly may further include a forward radially locating screw and an aft radially locating screw. The forward radially locating screw may extend through an outer wall of the first segment to engage with a radially outward facing surface of the first mount flange. The forward radially locating screw may push the first mount flange radially inward so that a top surface of the first pin hole engages a top surface of the first integrated pin. The aft radially locating screw may extend through an outer wall of the second segment to engage with a radially outward facing surface of the second mount flange. The aft radially locating screw may push the second mount flange radially inward so that a top surface of the second pin hole engages a top surface of the second integrated pin. The engagement of the pin holes with the integrated pins may radially locate the first mount flange so that the blade track segment is radially located in the turbine shroud assembly.

In another embodiment, the blade track segment may be made from Ceramic Matric Composite material. In other embodiments, the carrier assembly may be made from metallic material.

According to another aspect of the present disclosure, a turbine shroud assembly may include a turbine outer case, a carrier assembly, and a blade track segment. The turbine outer case may include a forward outer case and an aft outer case. The forward outer case may include a forward outer wall and a forward mount flange. The forward mount flange may extend radially outward from the outer wall at an aft terminating end of the forward outer wall. The aft outer case may include an aft outer wall and an aft mount flange. The aft mount flange may extend radially outward from the aft outer wall at a forward terminating end of the aft outer wall.

The carrier assembly may be made of metallic material and arranged circumferentially around an axis. The carrier assembly may include a forward carrier segment and an aft carrier segment. The forward carrier segment may include a forward flange, a forward outer wall, a forward radial wall, and a forward integrated pin. The forward flange may couple with the forward case flange. The forward outer wall may extend axially forward from the forward flange. The forward radial wall may extend radially inward from the forward outer wall. The forward integrated pin may extend axially aft from the forward radial wall. The aft carrier segment may include an aft flange, an aft outer wall, an aft radial wall, and an aft integrated pin. The aft flange may couple with the aft case flange and the forward flange. The aft outer wall may extend axially forward from the aft flange. The aft radial wall may extend radially inward from the aft outer wall. The aft integrated pin may extend axially forward from the aft radial wall.

The blade track segment may be made of ceramic matrix composite materials. The blade track segment may include an arcuate runner, a first mount flange, and a second mount flange. The arcuate runner may extend circumferentially partway around an axis to define a gas path boundary of the turbine shroud assembly. The first mount flange may extend radially outward from the runner, and the second mount flange may extend radially outward from the runner. The second mount flange may be aft of the first mount flange, and the first and second mount flanges may include pin holes. The forward integrated pin may extend through the pin hole in the first mount flange, and the aft integrated pin may extend through the pin hole in the second mount flange so that the blade track segment is coupled to the carrier assembly.

In some embodiments, a cooling hole may be formed in the forward integrated pin to provide cooling air to the aft integrated pin. In other embodiments, the forward integrated pin may have a greater axial length than the aft integrated pin. The forward integrated pin may extend axially aft to form a small gap between the forward integrated pin and the aft integrated pin so that cooling air is directly impinged onto the aft integrated pin.

In another embodiment, the turbine shroud assembly may include a sleeve that extends between the forward integrated pin and the aft integrated pin. The sleeve may transfer cooling air from the forward integrated pin to the aft integrated pin. In other embodiments, impingement cooling holes may be formed in a radially inward side of the sleeve to direct cooling air to an outer surface of the runner.

According to another aspect of the present disclosure, a method may include the steps of providing a turbine outer case arranged circumferentially around an axis, a blade track segment, and a carrier, the turbine outer case having a first case and a second case, the blade track segment including an arcuate runner that extends circumferentially partway around the axis, a first mount flange that extends radially outward from the runner, and a second mount flange that extends radially outward from the runner and is located axially aft of the first mount flange, the carrier including a first carrier segment that has integrated aft extending integrated pins and a second carrier segment aft that has integrated forward extending integrated pins, and the second carrier segment is aft of the first carrier.

The method may align the integrated pins of the first carrier segment with pin holes in the first mount flange, and integrated pins of the second carrier segment with pin holes in the second mount flange. The method may move the first carrier segment and the second carrier segment relative to each other so that the integrated pins of the first carrier segment may extend through the pin holes in the first mount flange, and the integrated pins of the second carrier segment may extend through the pin holes of the second mount flange. The method may further align the first case and the second case with flanges of the carrier, and move the first case and the second case relative to each other to trap the flanges of the carrier between the first case and the second case so that the carrier is supported by the turbine outer case and the blade track segment is supported by the carrier.

In some embodiments, the method may further include a bias member located between the forward radial wall and the first mount flange. The bias member may push the blade track segment axially aft so that the second mount flange engages a cordial seal that extends axially forward from the aft radial wall to axially locate the blade track segment. In other embodiments, the method may include forward radial set screws and aft radial set screws. The forward radial set screws may extend radially through the forward carrier segment to engage the first mount flange. The aft radial set screws may extend through the aft carrier segment to engage the second mount flange to block radial movement of the blade track segment.

These and other features of the present disclosure will become more apparent from the following description of the illustrative embodiments.

BRIEF DESCRIPTION OF THE DRAWINGS

FIG. 3 is a detailed view of a portion of FIG. 2 showing that the integrated forward and aft pins extend through pin holes in the forward and aft mount flanges of the blade track segment to couple therewith, and the integrated forward pin includes a cooling hole to direct cooling air toward the integrated aft pin and provide cooling air to a cavity between the blade track segment and carrier assembly. FIG. 3 further shows that a bias member urges the blade track segment aft toward a cordial seal to axially locate the blade track segment, and radially locating set screws extend radially inward through outer walls in the forward and aft carrier segments to push mount flanges of the blade track segment toward the integrated pins to radially locate the blade track segment;

FIG. 9 is a detailed view of a fourth turbine shroud assembly adapted for use with the gas turbine engine of FIG. 1 with a similar forward and aft carrier arrangement as the turbine shroud of FIG. 3 showing the outer wall of the aft carrier segment extends substantially across an axial portion of the blade track segment and is radially outward of both the forward and aft mount flanges of the blade track segment, the assembly flanges of the forward and aft carrier segments couple with the turbine outer case at a forward portion of the carrier assembly, and the forward mount flange of the blade track segment includes an angled outer surface that engages a corresponding angled surface of a forward radially locating screw that urges the blade track segment aft as the radially locating screw extends radially inward.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
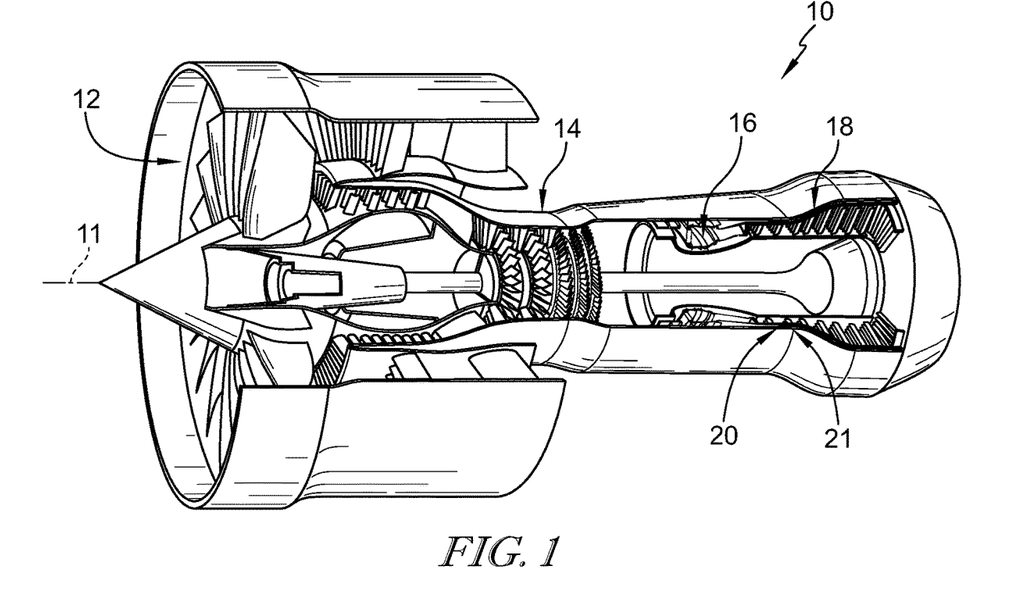
FIG. 1 is a cutaway perspective view of a gas turbine engine that includes a fan, a compressor, a combustor, and a turbine, the turbine includes a turbine shroud assembly that extends circumferentially around an axis and circumferentially around a turbine wheel that is driven to rotate about the axis of the engine to generate power.

An illustrative aerospace gas turbine engine 10 includes a fan 12, a compressor 14, a combustor 16, and a turbine 18 as shown in FIG. 1. The turbine 18 includes a turbine shroud assembly 20 that extends circumferentially around an axis 11 and circumferentially around a turbine bladed wheel assembly 21 that is driven to rotate about the axis 11 of the engine 10 to generate power. The turbine shroud assembly 20 includes a blade track segment 24 made from ceramic matrix composite material and a carrier assembly 26 made from metallic material that is coupled with the blade track segment 24 with integrated forward and aft pins 70, 72, 90, 92 to locate the blade track segment 24 relative to the turbine bladed wheel assembly 21.

Figure 2:
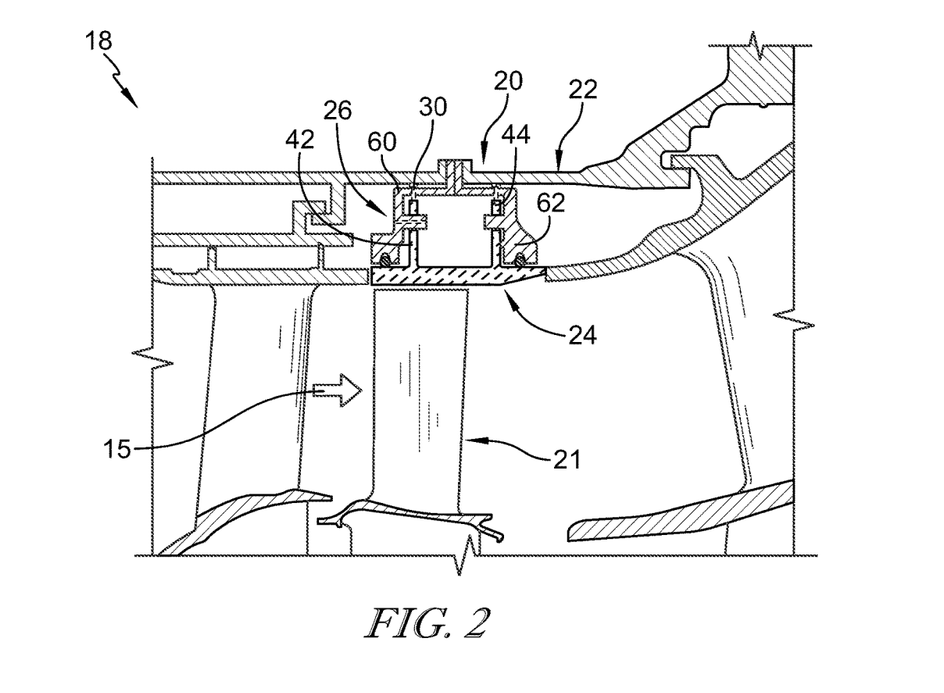
FIG. 2 is a cross-sectional view of a portion of the turbine included in the gas turbine engine of FIG. 1 showing one of the turbine wheel assemblies and the turbine shroud arranged around the turbine wheel assembly, the turbine shroud including a blade track segment with a forward mount flange and an aft mount flange, a turbine outer case, and a carrier assembly comprising a forward carrier segment and aft carrier segment, the forward and aft carrier segments include assembly flanges that couple with a turbine outer case, and the forward and aft carrier segments include integrated forward and aft pins that couple with the blade track segment.
Figure 3:
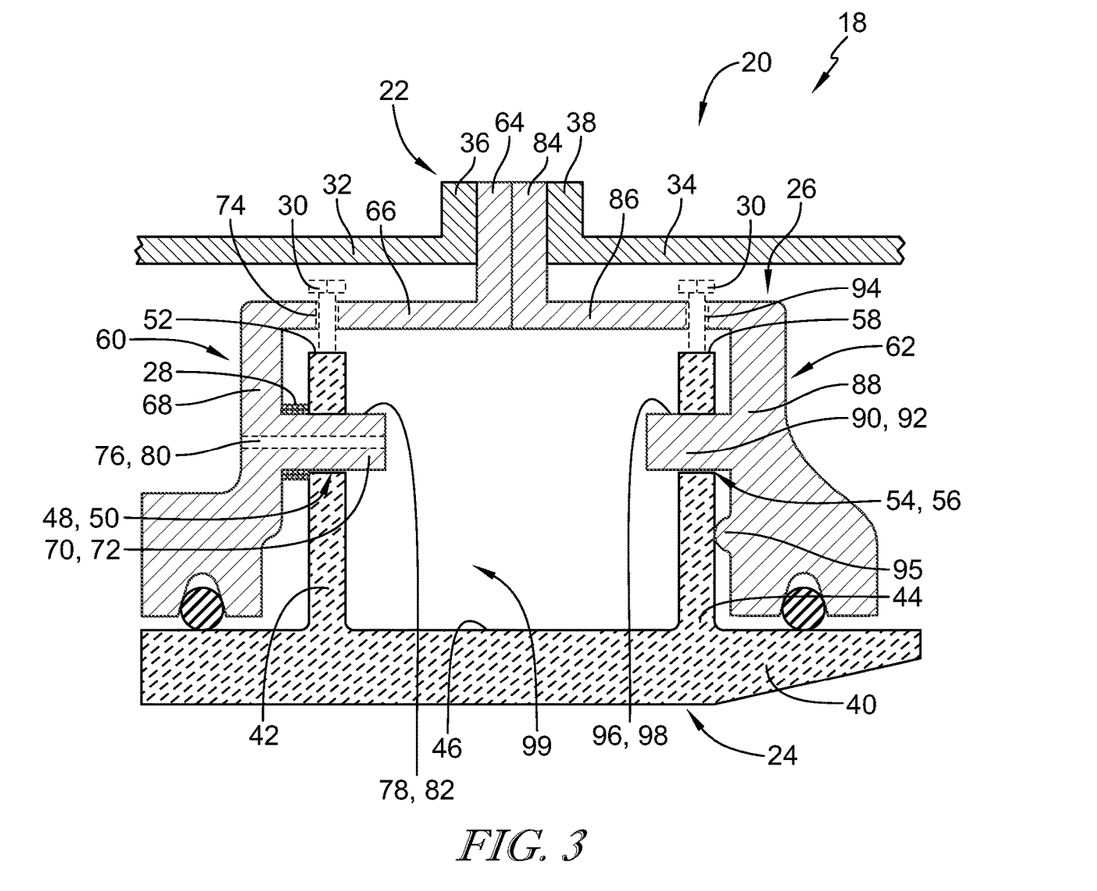
Figure 4:
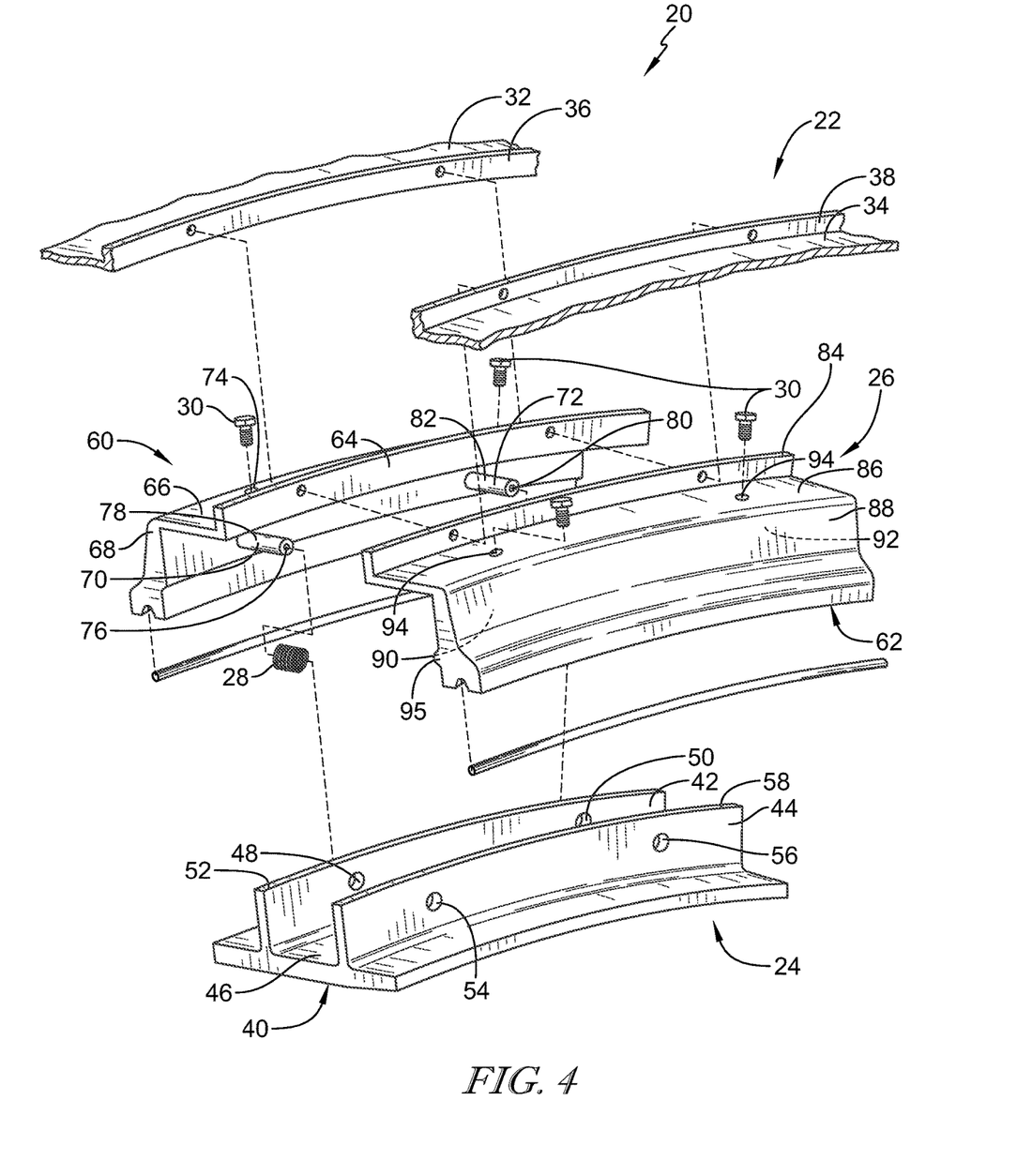
FIG. 4 is an exploded perspective view of the turbine shroud assembly of FIG. 3.

The carrier assembly 26 includes a forward carrier segment 60 and an aft carrier segment 62 located axially aft of the forward carrier segment 60 as shown in FIGS. 2, 3, and 4. The forward carrier segment 60 includes a forward flange 64 coupled with the turbine outer case 22, a forward outer wall 66 that extends axially forward from the forward flange 64, a forward radial wall 68 that extends radially inwards from a forward end of the forward outer wall 66, and integrated forward pins 70, 72 that are circumferential spaced apart from one another and extend axially aft from approximately a mid-height of the forward radial wall 68. The aft carrier segment 62 includes an aft flange 84 coupled with the turbine outer case 22, an aft outer wall 86 that extend axially aft from the aft flange 84, an aft radial wall 88 that extends radially inward from an aft end of the aft outer wall 86, and integrated aft pins 90, 92 that are circumferential spaced apart from one another and extend axially forward from the aft radial wall 88.

The blade track segment 24 includes a first mount flange 42 and a second mount flange 44 located axially aft of the first mount flange 42 as shown in FIGS. 3 and 4. The first mount flange 42 includes pin holes 48, 50 that are circumferentially spaced apart and align with the integrated forward pins 70, 72 of the forward carrier segment 60. The second mount flange 44 includes pin holes 54, 56 that are circumferentially spaced apart and align with the integrated aft pins 90, 92 of the aft carrier segment 62. The integrated forward pins 70, 72 of the forward carrier segment 60 extend axially aft through pin holes 48, 50, and the integrated aft pins 90, 92 of the aft carrier segment 62 extend axially forward through pin holes 54, 56 to couple the carrier assembly 26 to the blade track segment 24.

The fan 12 is driven by the turbine 18 and provides thrust for propelling an air vehicle as shown in FIG. 1. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. In some embodiments, the fan 12 may be replaced with a propeller, drive shaft, or other suitable configuration.

The turbine 18 includes a turbine bladed wheel assembly 21 and a turbine shroud assembly 20 positioned to surround the turbine bladed wheel assembly 21 as shown in FIG. 2. The turbine shroud assembly 20 extends circumferentially about the engine axis 11 and defines a gas path 15 outer boundary through which hot, high-pressure combustion products can flow. The turbine shroud assembly 20 includes a turbine outer case 22, a blade track segment 24 that forms the boundary with the gas path 15, a carrier assembly 26 that couples the blade track segment 24 with the turbine outer case 22, a bias member 28, and radially locating screws 30 as shown in FIGS. 2 and 3. The carrier assembly 26 is configured to radially and axially locate the blade track segment 24 relative to the turbine outer case 22 and turbine bladed wheel assembly 21.

The turbine outer case 22 extends circumferentially around the axis 11 and includes a forward outer case 32 and an aft outer case 34 located axially aft of the forward outer case 32 as shown in FIGS. 2, 3, and 4. The forward outer case 32 extends axially forward and can form the outer case of forward sections of the turbine 18 and/or assemble to forward sections of the gas turbine engine 10, such as the combustor 16. The aft outer case 34 extends axially aft and can form the outer case of an aft section of the turbine 18 and/or assemble to aft sections of the turbine 18, such as a low pressure turbine section. The forward outer case 32 includes a forward case flange 36 that extend radially outward at an aft terminating end of the forward outer case 32. The aft outer case 34 includes an aft case flange 38 that extends radially outward at a forward terminating end of the aft outer case 34. The forward and aft case flanges 36, 38 couple with the carrier assembly 26.

Each blade track segment 24 extends circumferentially partway around the engine axis 11 and forms the outer surface of the gas path 15 as shown in FIG. 2. The blade track segment 24 is made from ceramic matrix composite material and includes a runner 40, a first mount flange 42, and a second mount flange 44 as shown in FIGS. 2, 3, and 4. The runner 40 is arcuate and extends circumferential partway around the engine axis 11 and extends a limited axial distance across the engine axis 11. The runner 40 includes a radially inward surface that forms the outer boundary of the gas path 15 and a backside surface 46 that faces radially outward toward the carrier assembly 26. The first and second mount flanges 42, 44 extend radially outward from the runner 40 to provide structure for coupling the blade track segment 24 to the carrier assembly 26.

The first mount flange 42 extends radially outward from the runner 40 and is located forward of the second mount flange 44 as shown in FIGS. 3 and 4. The first mount flange 42 includes a first pin hole 48, a second pin hole 50 circumferentially spaced apart from the first pin hole 48, and a radial outward facing surface 52. The first and second pin holes 48, 50 extend axially through the first mount flange 42. The first mount flange 42 extends circumferentially across the runner 40 of the blade track segment 24. The radial outward facing surface 52 provides an engagement surface for the radially locating screws 30 to push against.

The second mount flange 44 extends radially outward from the runner 40 and is located aft of the first mount flange 42 as shown in FIGS. 3 and 4. The second mount flange 44 include a first pin hole 54, a second pin hole 56 circumferentially spaced apart from the first pin hole 54, and a radial outward facing surface 58. The first and second pin holes 54, 56 extend axially through the second mount flange 44. The second mount flange 44 extends circumferentially across the runner 40 of the blade track segment 24. The radial outward facing surface 58 provides an engagement surface for the radially locating screws 30 to push against.

In some embodiments, the first pin 48 of the first mount flange 42 and the first pin hole 54 of the second mount flange 44 form an arcuate slot that extends circumferentially a small distance. In a further embodiment, the second pin 50 of the first mount flange 42 and the second pin hole 56 of the second mount flange 44 form an arcuate slot that extends circumferentially a small distance.

The carrier assembly 26 is made from metallic materials and includes a forward carrier segment 60 and an aft carrier segment 62 positioned axially aft of the forward carrier segment 60 as shown in FIGS. 3 and 4. The forward carrier segment 60 is coupled to the forward outer case 32 and assembles around a forward portion of the blade track segment 24. The aft carrier segment 62 is coupled to the aft outer case 34 and assembles around an aft portion of the blade track segment 24.

The forward carrier segment 60 extends circumferentially partway around the axis 11 and couples with the forward outer case 32 and the first mount flange 42. In some embodiments, the forward carrier segment 60 may extend completely around the axis 11 for form a full hoop. The forward carrier segment 60 includes a forward flange 64, a forward outer wall 66, a forward radial wall 68, a first integrated forward pin 70, and a second integrated forward pins 72 as shown in FIGS. 3 and 4. The forward flange 64 extends radially outward from an aft end of the forward outer wall 66 and is located aft and adjacent to the forward case flange 36 and couples therewith.

The forward outer wall 66 extends axially forward from a radially inner end of the forward flange 64 and is located radially inward of the forward outer case 32. The forward outer wall 66 includes locating screw holes 74 that extend radially through the outer wall and are axially aligned with the radial outward facing surface 52 of the first mount flange 42. The forward radial wall 68 extends radially inward from a forward end of the forward outer wall 66 toward the runner 40 of blade track segment 24 to form a small gap therebetween. The forward radial wall 68 is located forward of the first mount flange 42.

The integrated forward pins 70, 72 extend axially aft from a mid-height of the forward radial wall 68 as shown in FIGS. 3 and 4. The first integrated forward pin 70 is circumferentially spaced apart from the second integrated forward pin 72. The first integrated forward pin 70 is circumferential aligned with the first pin hole 48 of the first mount flange 42. The second integrated forward pin 72 is circumferential aligned with the second pin hole 50 of the first mount flange 42. The first integrated forward pin 70 extends axially aft and through the first pin hole 48, and the second integrated forward pin 72 extends axially aft and through the second pin hole 50 so that the forward carrier segment 60 and the first mount flange 42 are coupled together.

The first integrated forward pin 70 includes a locating surface 78 and forms a pin cooling hole 76 that extends axially through the first integrated forward pin 70. The pin cooling hole 76 allows for cooling air to pass from a cavity forward of the forward carrier segment 60 to a shroud assembly cavity 99. The shroud assembly cavity 99 is located radially inward of the forward outer wall 66 and the aft outer wall 86, axially aft of the forward carrier segment 60 and the first mount flange 42, and axially forward of the aft carrier segment 62 and the second mount flange 44. The locating surface 78 provides an engagement surface at the radially outermost location of the first integrated forward pin 70 to engage with the first pin hole 48 and radially locate the first mount flange 42 and blade track segment 24.

The second integrated forward pin 72 includes a locating surface 82 and forms a pin cooling hole 80 that extends axially through the second integrated forward pin 72. The pin cooling hole 80 allows for cooling air to pass from a cavity forward of the forward carrier segment 60 to the shroud assembly cavity 99. The locating surface 82 provides an engagement surface at the radially outermost location of the second integrated forward pin 72 to engage with the second pin hole 50 and radially locate the first mount flange 42 and blade track segment 24.

The aft carrier segment 62 extends circumferentially partway around the axis 11 and couples with the aft outer case 34 and the second mount flange 44. In some embodiments, the aft carrier segment 62 may extend completely around the axis 11 for form a full hoop. The aft carrier segment 62 includes an aft flange 84, an aft outer wall 86, an aft radial wall 88, a first integrated aft pin 90, and a second integrated aft pin 92 as shown in FIGS. 3 and 4. The aft flange 84 extends radially outward from a forward end of the aft outer wall 86 and is located forward and adjacent to the aft case flange 38 and aft of the forward flange 64 and couples therewith.

The aft outer wall 86 extends axially aft from the aft flange 84 and is located radially inward of the aft outer case 34. The aft outer wall 86 includes locating screw holes 94 that extend radially through the aft outer wall 86 and are axially aligned with the radial outward facing surface 58 of the second mount flange 44. The aft radial wall 88 extends radially inward from an aft end of the aft outer wall 86 toward the runner 40 of blade track segment 24 to form a small gap therebetween. The aft radial wall 88 is located aft of the second mount flange 44 and includes a cordal seal 95 that extends axially forward a small distance to engage the second mount flange 44. The cordal seal 95 axially positions the blade track segment 24 relative to the carrier assembly 26 and turbine outer case 22.

The integrated aft pins 90, 92 extend axially forward from a mid-height of the aft radial wall 88. The first integrated aft pin 90 is circumferentially spaced apart from the second integrated aft pin 92. The first integrated aft pin 90 is circumferential aligned with the first pin hole 54 of the second mount flange 44. The second integrated aft pin 92 is circumferential aligned with the second pin hole 56 of the second mount flange 44. In the illustrative embodiment in FIG. 4, the integrated forward pins 70, 72, the integrated aft pins 90, 92, and the pin holes 48, 50, 54, 56 are all circumferentially aligned. The first integrated aft pin 90 extends axially forward and through the first pin hole 54, and the second integrated aft pin 92 extends axially forward and through the second pin hole 56 so that the aft carrier segment 62 and the second mount flange 44 are coupled together.

The first integrated aft pin 90 includes a locating surface 96 that provides an engagement surface at the radially outermost location of the first integrated aft pin 90. The locating surface 96 engages with the first pin hole 54 to radially locate the second mount flange 44 and blade track segment 24 relative to the turbine outer case 22. The second integrated aft pin 92 includes a locating surface 98 that provides an engagement surface at the radially outermost location of the second integrated aft pin 92. The locating surface 98 engages the second pin hole 56 to radially locate the second mount flange 44 and blade track segment 24 relative to the turbine outer case 22.

In illustrative embodiment, the forward outer wall 66 has the same axial length as the aft outer wall 86 so that the forward flange 64, the aft flange 84, and the turbine outer case flanges 36, 38 couple together at an approximate axial mid-point of the turbine shroud assembly 20. In another embodiment, the forward outer wall 66 may have a shorter axial length than the aft outer wall 86 so that the coupling location of the forward flange 64, the aft flange 84, and the turbine outer case flanges 36, 38 is biased toward a forward portion of the turbine shroud assembly 20. In a further embodiment, the forward outer wall 66 may have a greater axial length than the aft outer wall 86 so that the coupling location of the forward flange 64, the aft flange 84, and the turbine outer case flanges 36, 38 is biased toward an aft portion of the turbine shroud assembly 20.

The bias member 28 is a compressible component that pushes the blade track segment 24 aft in the assembly so that the blade track segment 24 is axially located when it engages the cordal seal 95 on the aft carrier segment 62. In the illustrative embodiment in FIGS. 3 and 4, the bias member 28 is a spring. The bias member 28 is assembled over one of the integrated forward pins 70, 72 and is located between the forward radial wall 68 and the first mount flange 42. In some embodiments, there may be only one bias member 28 assembled over one of the integrated forward pins 70, 72. In another embodiment, there may be multiple bias members 28 assembled over both integrated forward pins 70, 72.

The radial locating screws 30 assemble radially inward through the locating screw holes 74, 94 to engage with the radial outward facing surfaces 52, 58 respectively. The radial locating screws 30 push radially inward on the radial outward facing surfaces 52, 58 so that the pin holes 48, 50 of the first mount flange 42 engage the locating surfaces 78, 82 of the integrated forward pins 70, 72, and the pin holes 54, 56 of the second mount flange 44 engage the locating surfaces 96, 98 of the integrated aft pins 90, 92.

Figure 5:
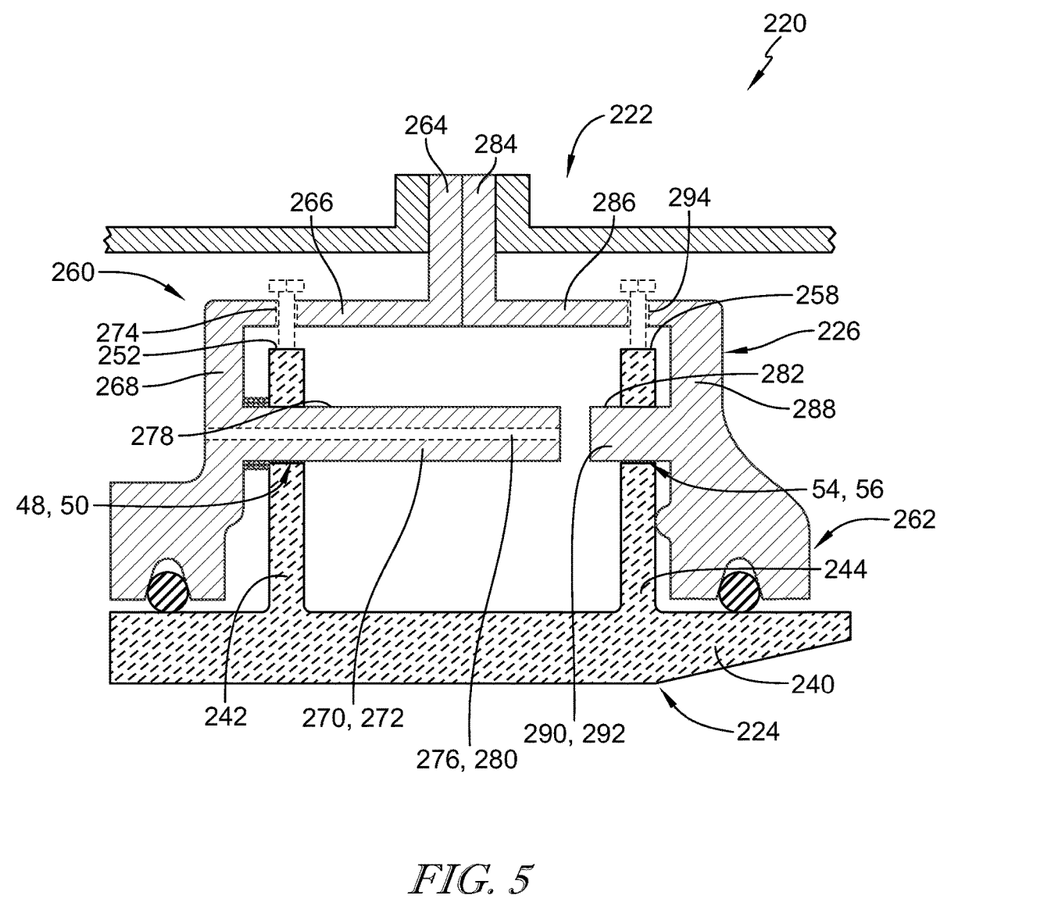
FIG. 5 is a detailed view of a second turbine shroud assembly adapted for use with the gas turbine engine of FIG. 1 with a similar forward and aft carrier arrangement as the turbine shroud of FIG. 3 showing that the second turbine shroud assembly includes an elongated integrated forward pin in the forward carrier segment that extends axially aft toward the integrated aft pin to form a small gap therebetween, and the cooling hole in the elongated integrated forward pin impinges cooling air on the integrated aft pin to prevent the integrated aft pin from overheating.
Figure 6:
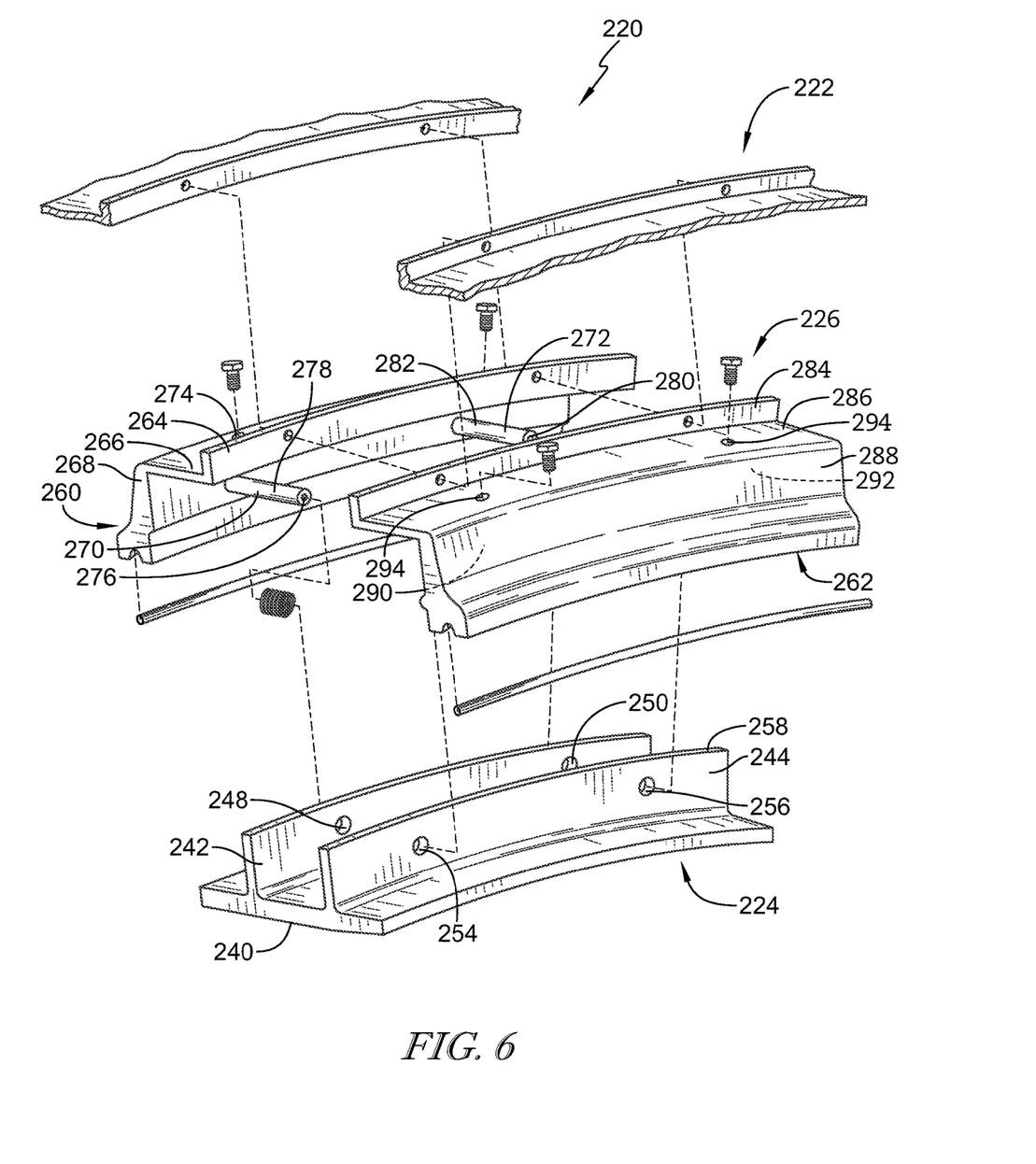
FIG. 6 is an exploded perspective view of the turbine shroud assembly of FIG. 5.

Another embodiment of a turbine shroud assembly 220 in accordance with the present disclosure is shown in FIGS. 5 and 6. The turbine shroud assembly 220 is substantially similar to the turbine shroud assembly 20 shown in FIGS. 1-4 and described herein. Accordingly, similar reference numbers in the 200 series indicate features that are common between the turbine shroud assembly 220 and the turbine shroud assembly 20. The description of the turbine shroud assembly 20 is incorporated by reference to apply to the turbine shroud assembly 220, except in instances when it conflicts with the specific description and the drawings of the turbine shroud assembly 220.

The turbine shroud assembly 220 includes a turbine outer case 222, a blade track segment 224 that forms the boundary with the gas path 15, a carrier assembly 226 that couples the blade track segment 224 with the turbine outer case 222, a bias member 228, and radially locating screws 230 as shown in FIGS. 5 and 6. The blade track segment 224 includes a runner 240, a first mount flange 242, and a second mount flange 244 as shown in FIGS. 5 and 6. The first mount flange 242 includes a first pin hole 248, a second pin hole 250, and a radial outward facing surface 252. The second mount flange 244 includes a first pin hole 254, a second pin hole 256, and a radial outward facing surface 258.

The carrier assembly 226 includes a forward carrier segment 260 and an aft carrier segment 262 positioned axially aft of the forward carrier segment 260 as shown in FIGS. 5 and 6. The forward carrier segment 260 and the aft carrier segment 262 are coupled to the turbine outer case 222. The forward carrier segment 260 includes a forward flange 264, a forward outer wall 266, a forward radial wall 268, and integrated elongated forward pins 270, 272.

The forward flange 264 extends radially outward from an aft end of the forward outer wall 266. The forward outer wall 266 extends axially forward from the forward flange 264. The forward outer wall 266 includes locating screw holes 274 that extend radially through the outer wall and are axially aligned with the radial outward facing surface 252 of the first mount flange 242. The forward radial wall 268 extends radially inward from a forward end of the forward outer wall 266 toward the runner 240 of blade track segment 224 to form a small gap therebetween.

The integrated elongated forward pins 270, 272 extend axially aft from a mid-height of the forward radial wall 268.

The first integrated elongated forward pin 270 is circumferentially spaced apart from the second integrated elongated forward pin 272. The first integrated elongated forward pin 270 is circumferential aligned with the first pin hole 248 of the first mount flange 242. The second integrated elongated forward pin 272 is circumferential aligned with the second pin hole 250 of the first mount flange 242. The first integrated elongated forward pin 270 extends axially aft and through the first pin hole 248, and the second integrated elongated forward pin 272 extends axially aft and through the second pin hole 250 so that the forward carrier segment 260 and the first mount flange 242 are coupled together.

The aft carrier segment 262 includes an aft flange 284, an aft outer wall 286, an aft radial wall 288, and integrated aft pins 290, 292 as shown in FIGS. 5 and 6. The aft outer wall 286 extends axially aft from the aft flange 284. The aft outer wall 286 includes locating screw holes 294 that extend radially through the aft outer wall 286 and are axially aligned with the radial outward facing surface 258 of the second mount flange 244. The aft radial wall 288 extends radially inward from an aft end of the aft outer wall 286 toward the runner 240 of blade track segment 224 to form a small gap therebetween.

The integrated aft pins 290, 292 extend axially forward from a mid-height of the aft radial wall 288. The first integrated aft pin 290 is circumferentially spaced apart from the second integrated aft pin 292. The first integrated aft pin 290 is circumferential aligned with the first pin hole 254 of the second mount flange 244. The first integrated aft pin 292 is circumferential aligned with the first pin hole 256 of the second mount flange 244. The first integrated aft pin 290 extends axially forward and through the first pin hole 254, and the second integrated aft pin 292 extends axially forward and through the second pin hole 256 so that the aft carrier segment 262 and the second mount flange 244 are coupled together.

The first integrated elongated forward pin 270 includes a locating surface 278 and forms a pin cooling hole 276 that extends axially through the first integrated elongated forward pin 270. The first integrated elongated forward pin 270 extends axially aft toward the first integrated aft pin 290 to form a small gap therebetween. The second integrated elongated forward pin 272 includes a locating surface 282 and forms a pin cooling hole 280 that extends axially through the second integrated elongated forward pin 272. The second integrated elongated forward pin 272 extends axially aft toward the second integrated aft pin 292 to form a small gap therebetween. The pin cooling holes 276, 280 allow for cooling air to be directly impinged onto the integrated aft pins 290, 292 to prevent the integrated aft pins 290, 292 from overheating.

Figure 7:
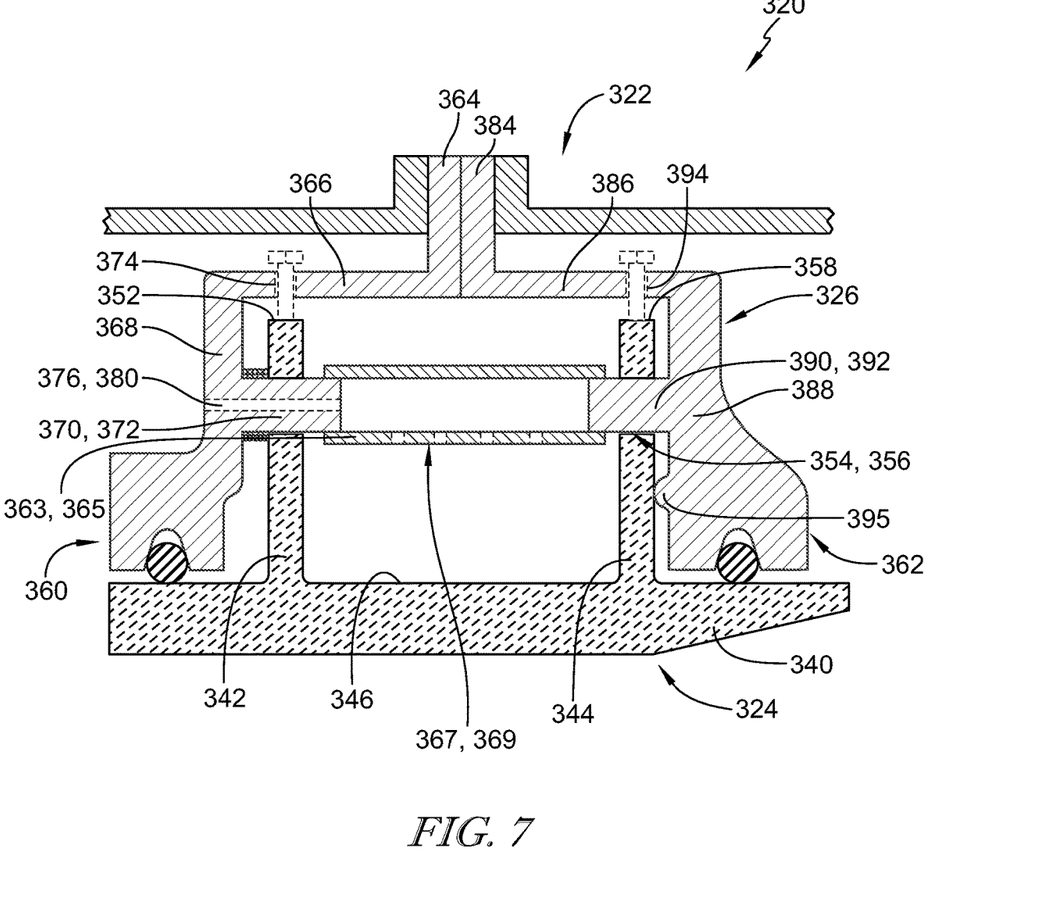
FIG. 7 is a detailed view of a third turbine shroud assembly adapted for use with the gas turbine engine of FIG. 1 with a similar forward and aft carrier arrangement as the turbine shroud of FIG. 3 showing that the third turbine shroud assembly includes a sleeve that mounts to the integrated forward and aft pins to directly provide cooling air to the integrated aft pin from the cooling hole of the integrated forward pin, and the sleeve further includes impingement cooling holes orientated toward the blade track segment to provide cooling air to a backside surface of the blade track segment.
Figure 8:
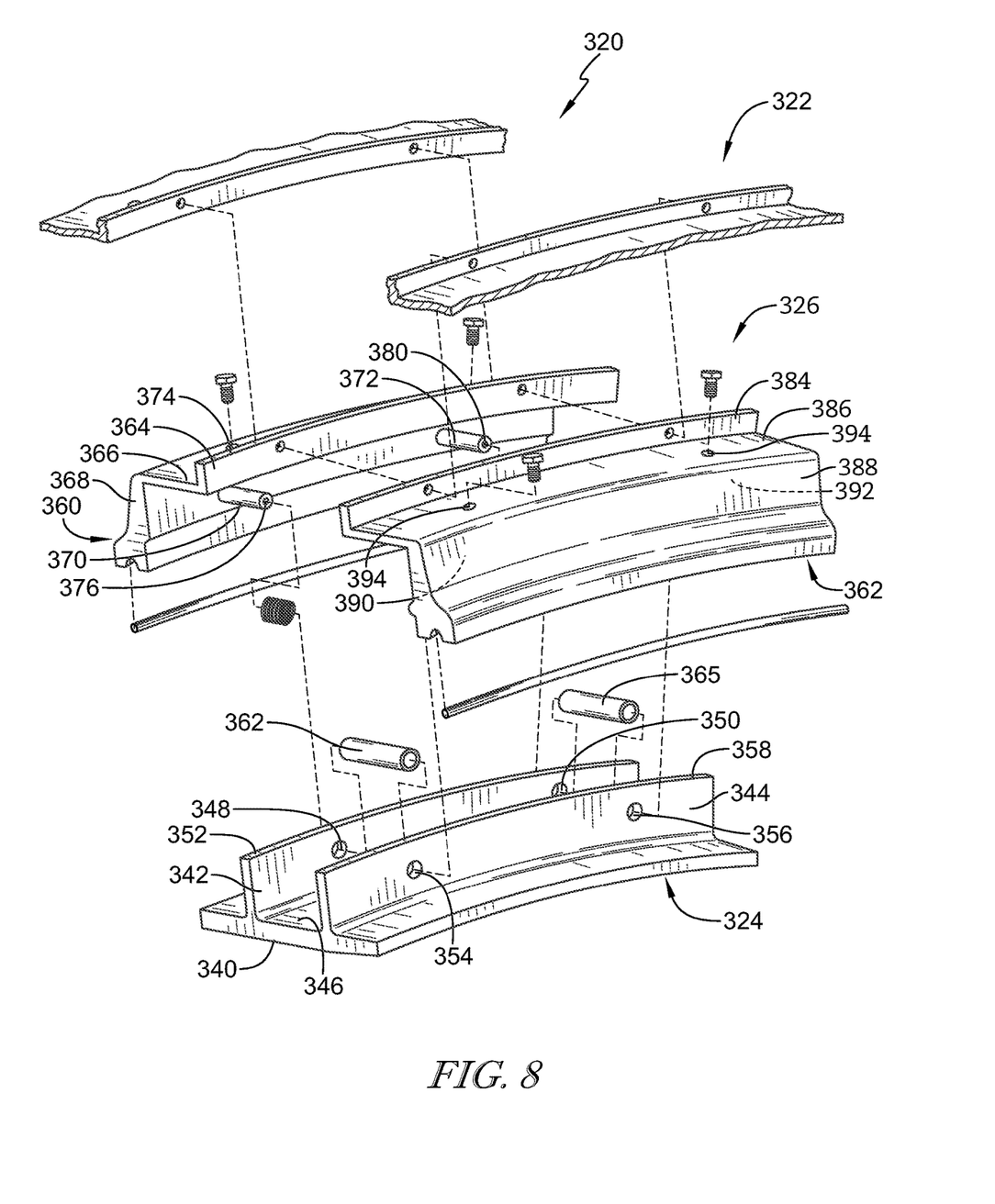
FIG. 8 is an exploded perspective view of the turbine shroud assembly of FIG. 7.

Another embodiment of a turbine shroud assembly 320 in accordance with the present disclosure is shown in FIGS. 7 and 8. The turbine shroud assembly 320 is substantially similar to the turbine shroud assembly 20 shown in FIGS. 1-4 and described herein. Accordingly, similar reference numbers in the 300 series indicate features that are common between the turbine shroud assembly 320 and the turbine shroud assembly 20. The description of the turbine shroud assembly 20 is incorporated by reference to apply to the turbine shroud assembly 320, except in instances when it conflicts with the specific description and the drawings of the turbine shroud assembly 320.

The turbine shroud assembly 320 includes a turbine outer case 322, a blade track segment 324 that forms the boundary with the gas path 15, a carrier assembly 326 that couples the blade track segment 324 with the turbine outer case 322, a bias member 328, and radially locating screws 330 as shown in FIGS. 7 and 8.

The blade track segment 324 includes a runner 340, a first mount flange 342, and a second mount flange 344. The first mount flange 342 includes a first pin hole 348, a second pin hole 350, and a radial outward facing surface 352. The second mount flange 344 includes a first pin hole 354, a second pin hole 356, and a radial outward facing surface 358. The runner 340 includes a radially inward surface that forms the outer boundary of the gas path 15 and a backside surface 346 that faces radially outward toward the carrier assembly 326.

The carrier assembly 326 includes a forward carrier segment 360, an aft carrier segment 362 positioned axially aft of the forward carrier segment 360, a first sleeve 363, and a second sleeve 365 as shown in FIGS. 7 and 8. The forward carrier segment 360 and the aft carrier segment 362 are coupled with the blade track segment 324 and the turbine outer case 322.

The forward carrier segment 360 includes a forward flange 364, a forward outer wall 366, a forward radial wall 368, a first integrated forward pin 370 and a second integrated forward pin 372. The forward flange 364 extends radially outward from an aft end of the forward outer wall 366. The forward outer wall 366 extends axially forward from the forward flange 364. The forward outer wall 366 includes locating screw holes 374 that extend radially through the outer wall and are axially aligned with the radial outward facing surface 352 of the first mount flange 342. The forward radial wall 368 extends radially inward from a forward end of the forward outer wall 366 toward the runner 340 of blade track segment 324 to form a small gap therebetween.

The integrated forward pins 370, 372 extend axially aft from a mid-height of the forward radial wall 368. The first integrated forward pin 370 is circumferentially spaced apart from the second integrated forward pin 372. The first integrated forward pin 370 is circumferential aligned with the first pin holes 348 of the first mount flange 342. The second integrated forward pin 372 is circumferential aligned with the second pin holes 350 of the first mount flange 342. The first integrated forward pin 370 extends axially aft and through the first pin hole 348, and the second integrated forward pin 372 extends axially aft and through the second pin hole 350 so that the forward carrier segment 360 and the first mount flange 342 are coupled together.

The aft carrier segment 362 includes an aft flange 384, an aft outer wall 386, an aft radial wall 388, and integrated aft pins 390, 392 as shown in FIGS. 7 and 8. The aft outer wall 386 extends axially aft from the aft flange 384. The aft outer wall 386 includes locating screw holes 394 that extend radially through the aft outer wall 386 and are axially aligned with the radial outward facing surface 358 of the second mount flange 344. The aft radial wall 388 extends radially inward from an aft end of the aft outer wall 386 toward the runner 340 of blade track segment 324 to form a small gap therebetween.

The integrated aft pins 390, 392 extend axially forward from a mid-height of the aft radial wall 388. The first integrated aft pin 390 is circumferentially spaced apart from the second integrated aft pin 392. The first integrated aft pin 390 is circumferential aligned with the first pin hole 354 in the second mount flange 344. The second integrated aft pin 392 is circumferential aligned with the second pin hole 356 in the second mount flange 344. The first integrated aft pin 390 extends axially forward and through the first pin hole 354, and the second integrated aft pin 392 extends axially forward and through the second pin hole 356 so that the aft carrier segment 362 and the second mount flange 344 are coupled together.

The first sleeve 363 is located aft of the first mount flange 342 and forward of the second mount flange 344, and is supported by the first integrated forward pin 370 and the first integrated aft pin 390. The first sleeve 363 is a hollow cylinder with an axial length greater than the axial gap between an aft terminal end of the first integrated forward pin 370 and a forward terminal end of the first integrated aft pin 390. The first sleeve 363 is configured to axially overlap with the terminal ends of the first integrated forward pin 370 and the first integrated aft pin 390 so that when the carrier assembly 326 is assembled, the first sleeve 363 remains coupled to the integrated first forward and aft pins 370, 390.

The second sleeve 365 is located aft of the first mount flange 342 and forward of the second mount flange 344, and is supported by the second integrated forward pin 372 and the second integrated aft pin 392. The second sleeve 365 is a hollow cylinder with an axial length greater than the axial gap between an aft terminal end of the second integrated forward pin 372 and a forward terminal end of the second integrated aft pin 392. The second sleeve 365 is configured to overlap with the terminal ends of the second integrated forward pin 372 and the second integrated aft pin 392 so that when the carrier assembly 326 is assembled, the second sleeve 365 remains coupled to the integrated second forward and aft pins 372, 392.

A plurality of cooling holes 367 are formed in the sleeve 363 and a plurality of cooling holes 369 are formed in the sleeve 365. Each of the plurality of cooling holes 367, 369 are orientated toward the backside surface 346 of the runner 340. The pin cooling holes 376, 380 allow for cooling air to be supplied to the hollow chamber within sleeves 363, 365. The sleeves 363, 365 may then transfer the cooling air toward the integrated aft pins to prevent the integrated aft pins 390, 392 from overheating. Cooling air may also pass through the plurality of cooling holes 367, 369 so that cooling air may be impinged on the backside surface 346 of the runner 340 to prevent the runner 340 from overheating.

In some embodiments, the sleeves 363, 365 include an anti-rotation feature that engages an anti-rotation feature on one of the integrated forward pins 370, 372, or the integrated aft pins 390, 392, or both the integrated forward and aft pins 370, 372, 390, 392. The anti-rotation feature maybe a machined notch or flat in one of the integrated pins 370, 372, 390, 392 or the sleeves 363, 365. In other embodiments, the sleeves may be bonded to one of the integrated forward pins 370, 372, or the integrated aft pins 390, 392 to maintain orientation of the sleeves 363, 365 in the carrier assembly 326.

Figure 9:
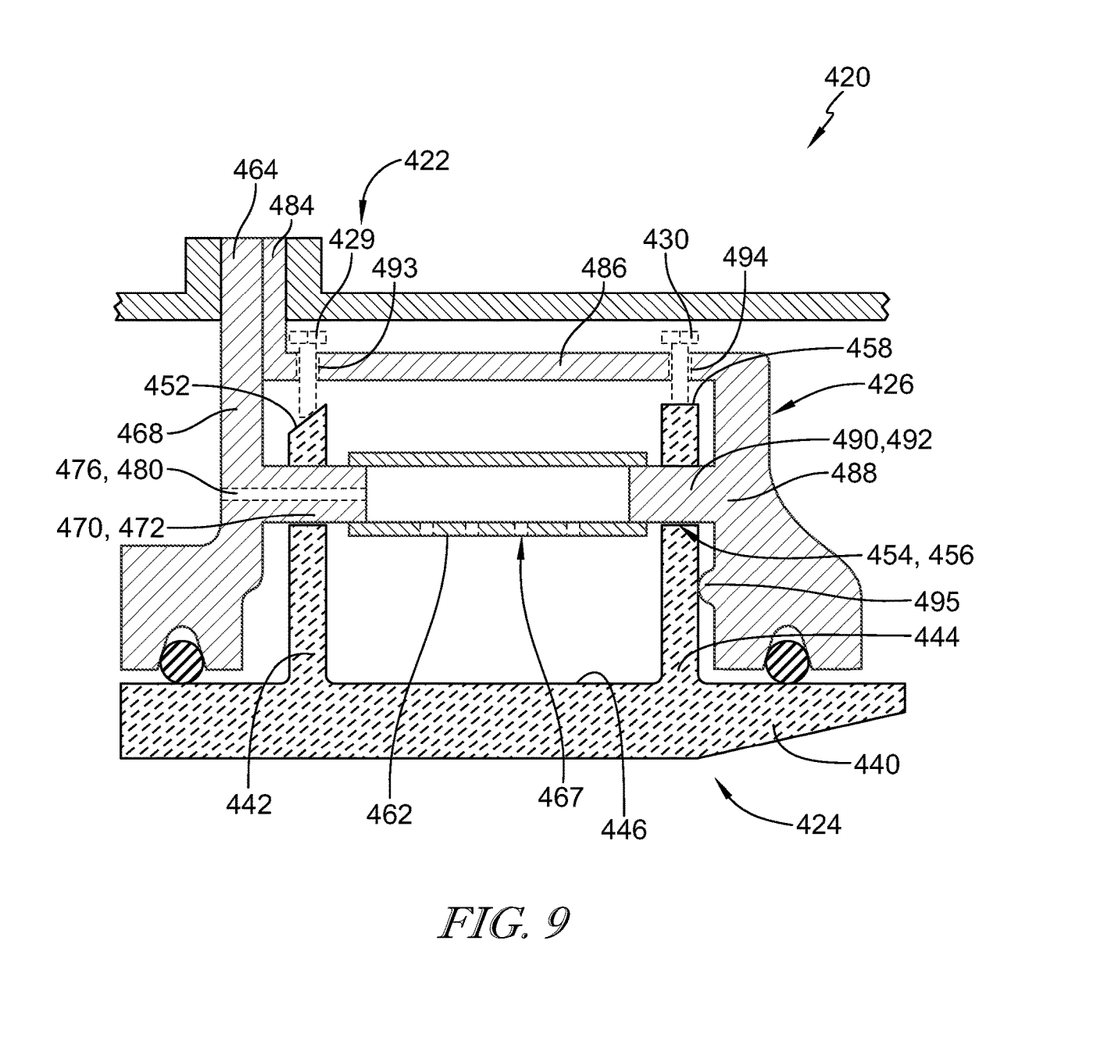
Figure 10:
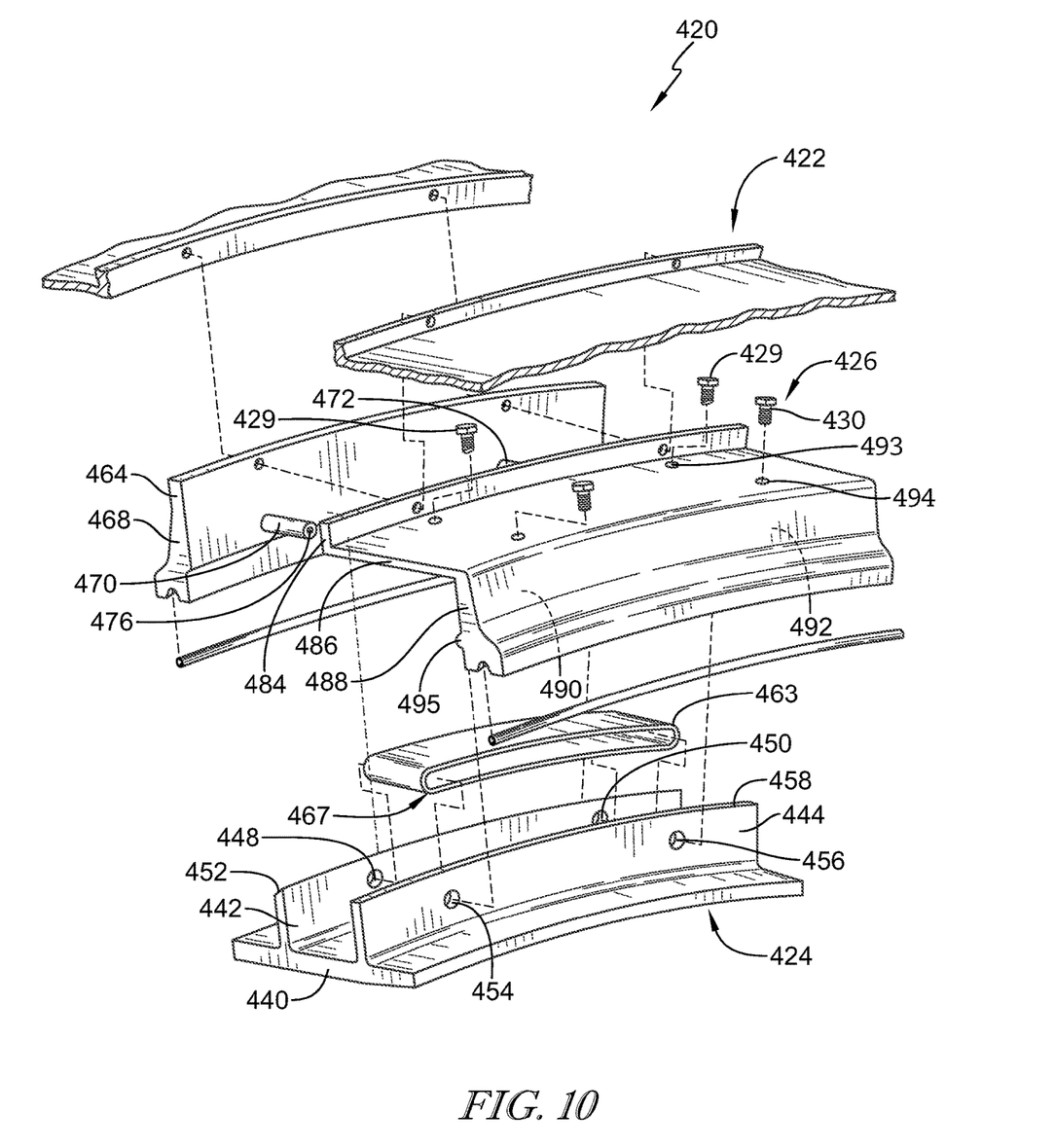
FIG. 10 is an exploded perspective view of the turbine shroud assembly of FIG. 9 showing that the sleeve extends circumferentially between the circumferentially spaced integrated forward and aft pins to provide cooling air from the cooling holes in the integrated forward pins to the integrated aft pins, and further provide impingement cooling holes to impinge cooling air across a substantial circumferential portion of the backside surface of the blade track segment.

Another embodiment of a turbine shroud assembly 420 in accordance with the present disclosure is shown in FIGS. 9 and 10. The turbine shroud assembly 420 is substantially similar to the turbine shroud assembly 20 shown in FIGS. 1-4 and described herein. Accordingly, similar reference numbers in the 400 series indicate features that are common between the turbine shroud assembly 420 and the turbine shroud assembly 20. The description of the turbine shroud assembly 20 is incorporated by reference to apply to the turbine shroud assembly 420, except in instances when it conflicts with the specific description and the drawings of the turbine shroud assembly 420.

The turbine shroud assembly 420 includes a turbine outer case 422, a blade track segment 424 that forms the boundary with the gas path 15, a carrier assembly 426 that couples the blade track segment 424 with the turbine outer case 422, a bias locating screws 429, and radial locating screws 430 as shown in FIGS. 9 and 10.

The blade track segment 424 includes a runner 440, a first mount flange 442, and a second mount flange 444 as shown in FIGS. 9 and 10. The first mount flange 442 includes a first pin hole 448, a second pin hole 450, and an angled outer surface 452 orientated to face radially outward and axially forward. The second mount flange 444 includes a first pin hole 454, a second pin hole 456, and a radial outward facing surface 458. The runner 440 includes a radially inward surface that forms the outer boundary of the gas path 15 and a backside surface 446 that faces radially outward toward the carrier assembly 426.

The carrier assembly 428 includes a forward carrier segment 460, an aft carrier segment 462 positioned axially aft of the forward carrier segment 460, and an elongated sleeve 463 as shown in FIGS. 9 and 10. The forward carrier segment 460 and the aft carrier segment 462 are coupled to the turbine outer case 422.

The forward carrier segment 460 includes a forward flange 464, a forward radial wall 468, and integrated forward pins 470, 472. The forward flange 464 extends radially outward from the forward radial wall 468 and couples with the turbine outer case 422 and the aft carrier segment 462. The forward radial wall 468 extends radially inward toward the runner 440 of blade track segment 424 to form a small gap therebetween.

The integrated forward pins 470, 472 extend axially aft from a mid-height of the forward radial wall 468. The integrated forward pins 470, 472 are circumferentially spaced apart and circumferential aligned with the pin holes 448, 450 respectively of the first mount flange 442. The first integrated forward pin 470 extends axially aft and through the first pin hole 448, and the second integrated forward pin 472 extends axially aft and through the second pin hole 450 so that the forward carrier segment 460 and the first mount flange 442 are coupled together.

The aft carrier segment 462 includes an aft flange 484, an aft outer wall 486, an aft radial wall 488, and integrated aft pins 490, 492 as shown in FIGS. 9 and 10. The aft outer wall 486 extends axially aft from the aft flange 484 and is located radially above both of the first and second mount flanges 442, 444. The aft outer wall 486 includes forward locating screw holes 493 and aft locating screw holes 494 that extend radially through the aft outer wall 486. The forward locating screw holes 493 are axially aligned with the angled outer surface 452 of the first mount flange 442. The aft locating screw holes 494 are axially aligned with the radial outward facing surface 458 of the second mount flange 444. The aft radial wall 488 extends radially inward from an aft end of the aft outer wall 486 toward the runner 440 of blade track segment 424 to form a small gap therebetween. The aft radial wall 488 includes a cordal seal 495 that extends axially forward a small distance to engage the second mount flange 444 and axially positions the blade track segment 424 relative to the carrier assembly 426 and turbine outer case 422.

The integrated aft pins 490, 492 extend axially forward from a mid-height of the aft radial wall 488. The integrated aft pins 490, 492 are circumferentially spaced apart and circumferential aligned with the pin holes 454, 456 respectively in the second mount flange 444. The first integrated aft pin 490 extends axially forward and through the first pin hole 454, and the second integrated aft pin 492 extends axially forward and through the second pin hole 456 so that the aft carrier segment 462 and the second mount flange 444 are coupled together.

The elongated sleeve 463 is located aft of the first mount flange 442 and forward of the second mount flange 444, and extends circumferentially between the integrated forward and aft pins 470, 490 and the integrated forward and aft pins 472, 492. The elongated sleeve 463 is supported by each of the integrated forward and aft pins 470, 472, 490, 492. The elongated sleeve 463 has radial and circumferential walls and forms an axially extending passageway through the elongated sleeve 463. The elongated sleeve 463 has an axial length greater than the axial gap between an aft terminal end of the integrated forward pins 470, 472 and a forward terminal end of the integrated aft pins 490, 492. The elongated sleeve 463 is configured to overlap with the terminal ends of the integrated forward pins 470, 472 and the integrated aft pins 490, 492 so that when the carrier assembly 426 is assembled, the elongated sleeve 463 remains coupled to the integrated forward and aft pins 470, 472, 490, 492.

A plurality of cooling holes 467 are formed in the elongated sleeve 463 and orientated toward the backside surface 446 of the runner 440. The pin cooling holes 476, 480 allow for cooling air to be supplied to the hollow cavity within the elongated sleeve 463. Cooling air may pass through the hollow cavity in the elongated sleeve 463 toward the integrated aft pins 490, 492 to prevent the integrated aft pins 490, 492 from overheating. Cooling air may also pass through the plurality of cooling holes 467 so that cooling air may be impinged on the backside surface 446 of the runner 440 to prevent the runner 440 from overheating.

The radial locating screws 430 assemble radially inward through the aft locating screw holes 494 to engage with the radial outward facing surfaces 458 of the second mount flange 444. The radial locating screws 430 push radially inward on the radial outward facing surfaces 458 so that the pin holes 454, 456 of the second mount flange 444 engage locating surfaces on the integrated aft pins 490, 492 to radially locate the second mount flange 444.

The biasing locating screws 429 assemble radially inward through the forward locating screw holes 493 to engage with the angled outer surface 452 of the first mount flange 442. As the biasing locating screws 429 push radially inward on the angled outer surface 452, a reaction force cause by the geometry of the angled outer surface 452 causes a radially inward and axially aft movement of the first mount flange 442. The radially inward movement causes the pin holes 448, 450 of the first mount flange 442 to engage locating surfaces on the integrated forward pins 470, 472 so that the first mount flange 442 is radially located. The axially aft movement causes the blade track segment 424 to be urged axially aft until the second mount flange 444 engages the cordal seal 495 to axially located the blade track segment 424.

The present disclosure provides a method for supporting a CMC seal segment 24 utilizing a carrier 26 that has the support pins 70, 72, 90, 92 integral with the carrier 26 as shown in FIGS. 3 and 4. In the illustrative embodiment, a two-piece carrier 60, 62 may include locating pins 70, 72, 90, 92 on both pieces of the carrier 60, 62. The carrier 26 may be assembled around the seal segment 24. Pressure or a loading feature 28 may urge the segment 24 aft against the cordal seal 95. The carrier 26 could be split in any location along the radial outboard horizontal member 66, 86 and could be secured with bolts, pins with snap rings, or features within the case 22. The present disclosure may take advantage of having the pin 70, 72 integral with the carrier 60 so that the pin 70, 72 may be kept cooler due to the conduction path with the main body of the carrier 60. Another embodiment of the present disclosure may include a hole 76, 80 machined through the forward pin 70, 72 and cooling air allowed to flow into a cavity 99 within the carrier assembly 26 to cool the forward pin 70, 72.

A further embodiment of the present disclosure may include an elongated forward pin 270, 272 that may extend until it is within a distance where impingement would be effective to the aft pin 290, 292 as shown in FIGS. 5 and 6. The hole 276, 280 may be machined through the forward pin 270, 272 and the cooling air may be allowed to impinge on to the aft pin 290, 292 to provide cooling to the aft pin 290, 292.

Another embodiment may include a sleeve 363, 365 that may be installed over and between the forward and aft pins 370, 372, 390, 392 as shown in FIGS. 7 and 8. A tight fit between the forward and aft pins 370, 372, 390, 392 and the sleeves 363, 365 may help resist bending of the pins 370, 372, 390, 392 due to loads imparted by the seal segment 324. The sleeves 363, 365 may be manufactured so that they may have known rotational position and a hole 367, 369 may be machined at the bottom of the sleeves 363, 365 to allow air to be introduced at a desired axial position relative to the forward and aft flanges 342, 344. This may allow the air to be used to cool the forward and aft pins 370, 372, 390, 392 as well as introduce cooling air over the center section 346 of the segment 324. The sleeve 363, 365 may be used to load the segment 324 aft against the cordal seal 395.

A further embodiment may include set screws 30 that may be installed through the top of the carrier 66, 86 and engage the top of the segment flanges 52, 58 to block radial motion of the seal segment 24.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly for use with a gas turbine engine, the turbine shroud assembly comprising
a turbine outer case arranged circumferentially around an axis,
a blade track segment including an arcuate runner that extends circumferentially around the axis to define a gas path boundary of the turbine shroud assembly and an attachment feature that extends radially outward from the runner, the attachment feature includes a first mount flange and a second mount flange located axially aft of the first mount flange, and
a carrier assembly configured to couple the blade track segment to the turbine outer case, the carrier assembly including a first carrier segment shaped to have (i) a first radial wall located forward of the first mount flange and (ii) a first integrated support pin that extends axially aft from the first radial wall and through a first pin hole in the first mount flange to couple therewith and a second carrier segment shaped to have (i) a second radial wall located aft of the second mount flange and (ii) a second integrated pin that extends axially forward from the second radial wall and through a second pin hole in the second mount flange to couple therewith.

2. The turbine shroud assembly of claim 1, wherein a cooling hole is formed in the first integrated support pin to provide cooling air to the second integrated support pin and an outer surface of the arcuate runner of the blade trade segment.

3. The turbine shroud assembly of claim 2, wherein the first integrated support pin has a greater axial length than the second integrated support pin and the first integrated support pin extends axially aft to form a small gap between the first integrated support pin and the second integrated support pin so that cooling air is directly impinged onto the second integrated support pin.

4. The turbine shroud assembly of claim 2, further comprising a sleeve that extends between the first integrated support pin and the second integrated support pin to transfer cooling air from the first integrated support pin to the second integrated support pin.

5. The turbine shroud assembly of claim 4, wherein impingement cooling holes are formed in a radially inward side of the sleeve to direct cooling air to the outer surface of the arcuate runner.

6. The turbine shroud assembly of claim 2, wherein the first carrier segment further includes a third integrated support pin that extends axially aft from the first radial wall and is circumferentially spaced apart from the first integrated support pin, the second carrier segment includes a fourth integrated support pin that extends axially forward from the second radial wall and is circumferentially spaced apart from the second integrated support pin.

7. The turbine shroud assembly of claim 6, wherein a cooling hole is formed in the third integrated support pin.

8. The turbine shroud assembly of claim 7, further comprising an elongated sleeve that extends circumferentially between the first and third integrated support pins and axially between the first and second integrated support pins and third and fourth integrated support pins so that cooling air is transferred from the first and third integrated support pins to the second and fourth integrated support pins.

9. The turbine shroud assembly of claim 8, wherein impingement cooling holes are formed in a radially inward side of the elongated sleeve to direct cooling air to the outer surface of the arcuate runner.

10. The turbine shroud assembly of claim 1, wherein a bias member is located between the first radial wall and the first mount flange to push the blade track segment axially aft so that the second mount flange engages a cordial seal that axially locates the blade track segment.

11. The turbine shroud assembly of claim 10, wherein a forward radially locating screw extends through an outer wall of the first segment to engage with a radially outward facing surface of the first mount flange to push the first mount flange radially inward so that a top surface of the first pin hole engages a top surface of the first integrated pin and an aft radially locating screw extends through an outer wall of the second segment to engage with a radially outward facing surface of the second mount flange to push the second mount flange radially inward so that a top surface of the second pin hole engages a top surface of the second integrated pin to radially locate the first mount flange so that the blade track segment is radially located in the turbine shroud assembly.

12. The turbine shroud assembly of claim 1, wherein the blade track segment is made from Ceramic Matric Composite material and the carrier assembly is made from metallic material.

13. A turbine shroud assembly for use with a gas turbine engine, the turbine shroud assembly comprising a turbine outer case including a forward outer case and an aft outer case, the forward outer case including a forward outer wall, and a forward mount flange extending radially outward from the outer wall at an aft terminating end of the forward outer wall, the aft outer case including an aft outer wall, and an aft mount flange extending radially outward from the aft outer wall at a forward terminating end of the aft outer wall, a carrier assembly made of metallic material and arranged circumferentially around an axis, the carrier assembly comprising a forward carrier segment and an aft carrier segment, the forward carrier segment including a forward flange that couples with the forward case flange, a forward outer wall that extends axially forward from the forward flange, a forward radial wall that extends radially inward from the forward outer wall, and a forward integrated pin that extends axially aft from the forward radial wall, the aft carrier segment including an aft flange that couples with the aft case flange and the forward flange, an aft outer wall that extends axially forward from the aft flange, an aft radial wall that extends radially inward from the aft outer wall, and an aft integrated pin that extends axially forward from the aft radial wall, and a blade track segment made of ceramic matrix composite materials, the blade track segment including an arcuate runner that extends circumferentially partway around an axis to define a gas path boundary of the turbine shroud assembly, a first mount flange that extends radially outward from the runner, and a second mount flange that extends radially outward from the runner, the second mount flange is aft of the first mount flange, and each of the first and second mount flanges include pin holes, wherein the forward integrated pin extends through the pin hole in the first mount flange, and the aft integrated pin extends through the pin hole in the second mount flange so that the blade track segment is coupled to the carrier assembly.

14. The turbine shroud assembly of claim 13, wherein a cooling hole is formed in the forward integrated pin to provide cooling air to the aft integrated pin.

15. The turbine shroud assembly of claim 14, wherein the forward integrated pin has a greater axial length than the aft integrated pin and the forward integrated pin extends axially aft to form a small gap between the forward integrated pin and the aft integrated pin so that cooling air is directly impinged onto the aft integrated pin.

16. The turbine shroud assembly of claim 14, further comprising a sleeve that extends between the forward integrated pin and the aft integrated pin to transfer cooling air from the forward integrated pin to the aft integrated pin.

17. The turbine shroud assembly of claim 16, wherein impingement cooling holes are formed in a radially inward side of the sleeve to direct cooling air to an outer surface of the runner.

18. A method comprising providing a turbine outer case arranged circumferentially around an axis, a blade track segment, and a carrier, the turbine outer case having a first case and a second case, the blade track segment including an arcuate runner that extends circumferentially partway around the axis, a first mount flange that extends radially outward from the runner, and a second mount flange that extends radially outward from the runner and is located axially aft of the first mount flange, the carrier including a first carrier segment that has integrated aft extending integrated pins and a second carrier segment aft that has integrated forward extending integrated pins, and the second carrier segment is aft of the first carrier, aligning the integrated pins of the first carrier segment with pin holes in the first mount flange, and integrated pins of the second carrier segment with pin holes in the second mount flange, moving the first carrier segment and the second carrier segment relative to each other so that the integrated pins of the first carrier segment extend through the pin holes in the first mount flange, and the integrated pins of the second carrier segment extend through the pin holes of the second mount flange, aligning the first case and the second case with flanges of the carrier, and moving the first case and the second case relative to each other to trap the flanges of the carrier between the first case and the second case so that the carrier is supported by the turbine outer case and the blade track segment is supported by the carrier.

19. The method of claim 18, further comprising a bias member located between the forward radial wall and the first mount flange to push the blade track segment axially aft so that the second mount flange engages a cordial seal that extends axially forward from the aft radial wall to axially locate the blade track segment.

20. The method of claim 18, further comprising forward radial set screws that extend radially through the forward carrier segment to engage the first mount flange, and aft radial set screws that extend through the aft carrier segment to engage the second mount flange to block radial movement of the blade track segment.

* * * * *